J. W. KUMMER.
DOUBLE ROLLER BEARING.
APPLICATION FILED APR. 30, 1917.
1,253,984. Patented Jan. 15, 1918.
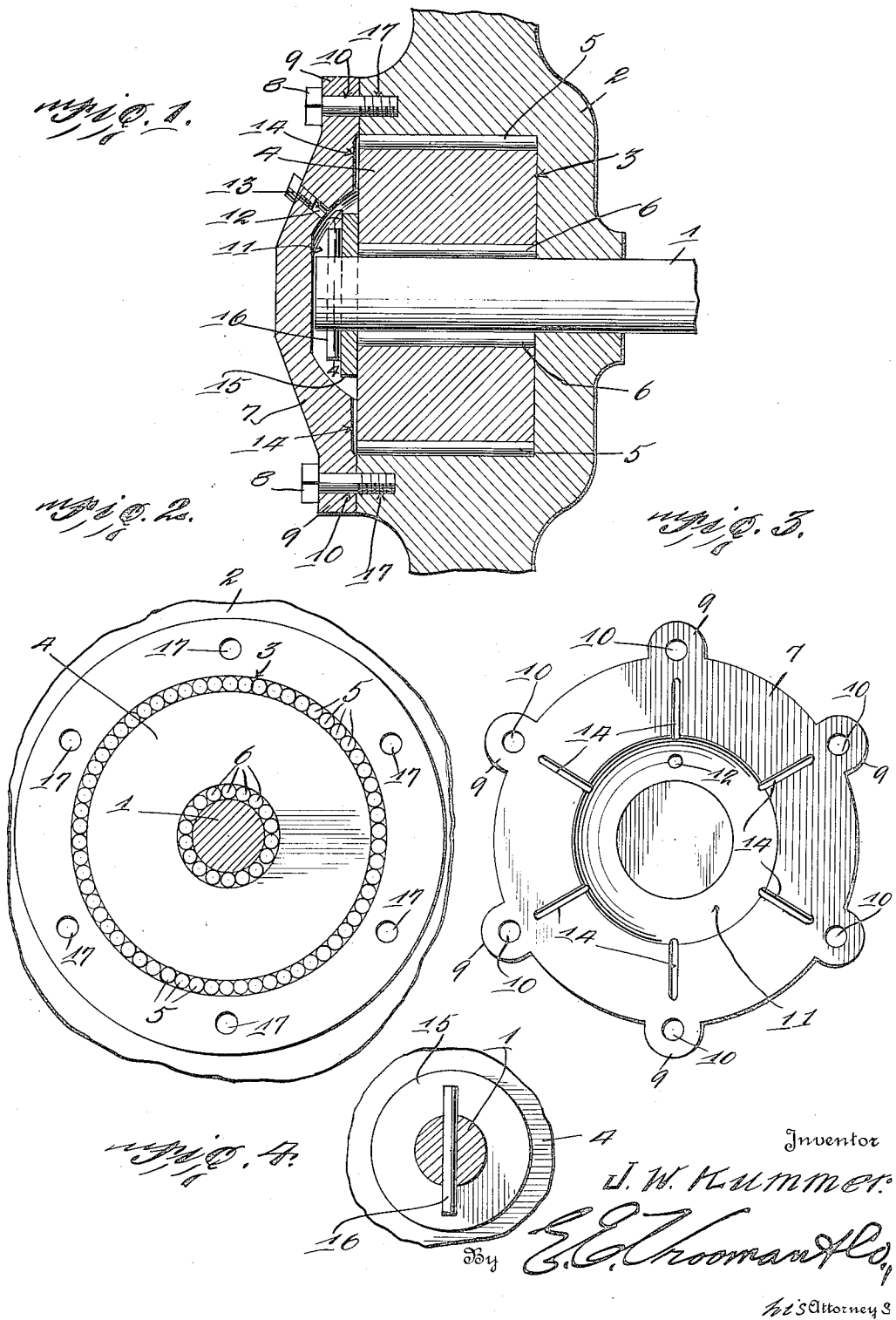

UNITED STATES PATENT OFFICE.

JOHN WILLIAM KUMMER, OF EDGEMONT, NEVADA.

DOUBLE ROLLER-BEARING.

1,253,984.  Specification of Letters Patent.  Patented Jan. 15, 1918.

Application filed April 30, 1917. Serial No. 165,497.

*To all whom it may concern:*

Be it known that I, JOHN W. KUMMER, a citizen of the United States, residing at Edgemont, in the county of Elko and State of Nevada, have invented certain new and useful Improvements in Double Roller-Bearings, of which the following is a specification, reference being had therein to the accompanying drawing.

This invention relates to a double roller bearing and has for its principal object the production of a simple and efficient bearing which comprises a rotatable hub which is mounted upon a plurality of roller bearings.

Another object of this invention is the production of a plate which is conical in shape and is provided with a plurality of radial oil channels.

Another object of this invention is the production of a plate which will hold a certain amount of oil and will not only feed the inner roller bearings but will also feed the outer roller bearings.

A still further object of this invention is the production of a plate provided with means for inserting oil without entirely removing the same.

With these and other objects in view this invention consists of certain novel combinations, constructions, and arrangements of parts, as will be hereinafter fully described and claimed.

In the accompanying drawings:—

Figure 1 is a fragmentary vertical section through the device.

Fig. 2 is a fragmentary front elevation of the device, showing the plate removed.

Fig. 3 is an inner plane view of the plate.

Fig. 4 is a fragmentary view of the plate removed, showing how the device is retained upon an axle.

Referring to the accompanying drawing by numerals it will be seen that 1 designates the axle which is stationary, fastened upon a vehicle. Upon this axle 1 is mounted the wheel 2. This wheel 2 is provided with the cylindrical well 3 which well is adapted to receive the hub 4.

It will be seen by referring to Figs. 1 and 2 that this roller hub 4 is carried within the well 3 and bears upon the wheel 2 by means of the outer bearing rollers 5 and upon the axle 1 by means of the inner bearing rollers 6. From this construction it will be seen that the wheel 2 may be rotated upon the stationary axle 1 with great ease because the friction will be diminished to the lowest possible point by having the hub 4 rotatably mounted upon the roller bearings 5 and 6. By referring to Fig. 1 it will be seen that there is mounted upon the wheel 2 the substantially conical shaped plate 7 by means of the bolts 8. It will be seen by referring to Fig. 3 that a plan view of the plate shows the same to be circular and to be provided with a plurality of lugs 9 which are provided with apertures 10 for receiving the bolts 8. It will also be seen that this plate is provided with the conical indentation 11 which indentation is provided with the opening 12, which opening 12 will receive the stopper bolt 13.

It will be seen that by having the opening 12 in the slanting portion of the conical indentation that the indentation may be filled with oil which will efficiently lubricate the device. Upon the flat surface of the plate 7 are provided a plurality of radial oil channels 14 which extend into the indentation 11 and extend outwardly so as to terminate adjacent the edges of the outer bearing rollers 5, whereby it will be seen that as the wheel 2 rotates the hub 4 will cause the outer bearing rollers 5 to come into contact with the oil which will be fed through the radial channels 14 from time to time so that the same will be efficiently lubricated. The hub 4 and the inner bearing rollers 6 are efficiently held in place by means of the washer 15, which washer is held upon the axle 1 by means of the pin 16, or any other suitable means.

From the above description it will be seen that this device may be used upon any sort of wheel, that is, any wheel which is used for vehicle purposes and is provided with the well 3 and a plurality of threaded apertures 17 for receiving the plate retaining bolt 8. From the device as described, it will be seen that it is of a simple construction and comprises a wheel which is mounted upon the outer roller bearings 5, which bearings are mounted upon the hub 4, and said hub being mounted upon the axle roller bearing 6, which roller bearing in turn bears upon the axle 1 whereby the same will be efficiently rotated with the least amount of friction. It will, therefore, be seen that a simple and efficient means have been provided whereby the inner bearing may be efficiently lubricated, and at the same time channels are provided upon the inner flat face of the plate 7, whereby the outer roller bearing 5 may be also efficiently lubricated.

What is claimed is:—

1. A device of the class described, comprising a wheel, a cylindrical well provided within said wheel, roller bearing means carried within said wheel, means provided for retaining said roller bearing means within said wheel, a plate fixedly secured to said wheel, said plate being circular in plan view, a plurality of retaining lugs provided upon the outer periphery of said plate, a conical indentation provided in the central portion of said plate, means provided for allowing oil to be fed and to be retained within said indentation, and means provided upon the inner flat face of said plate for feeding oil to the outermost portions of said wheel.

2. A device of the class described, comprising a wheel, a cylindrical well provided within said wheel, roller bearing means carried within said wheel, means provided for retaining said roller bearing means within said wheel, a plate fixedly secured to said wheel, said plate being circular in plan view, a plurality of retaining lugs provided upon the outer periphery of said plate, a conical indentation provided in the central portion of said plate, means provided for allowing oil to be fed and to be retained within said indentation, and a plurality of radially extending oil channels provided upon the flat inner face of said plate, said channels extending as far as the adjacent face of said wheel.

3. In a device of the class described, the combination of a wheel, said wheel being rotatably mounted upon an axle, a cylindrical well provided within said wheel, a cylindrical hub carried upon said axle and within said wheel, the outer face of said hub provided with a plurality of bearing rollers and the inner face thereof provided with a plurality of bearing rollers, whereby said hub will easily rotate upon said axle, a plate fixedly attached to said wheel, said plate provided with an inner flat face, around its periphery, a conical indentation provided within the central portion of said plate, an aperture provided within said conical indentation, whereby oil may be fed into the same, a stopper plug adapted to fit within said aperture, radial channels provided upon the flat face of said plate and adapted to extend for a distance so as to terminate adjacent said outer bearing rollers, whereby the oil fed into said indentation will pass through the channels, thereby lubricating said outer bearing rollers.

In testimony whereof I hereunto affix my signature.

JOHN WILLIAM KUMMER.